(12) United States Patent
Phipps et al.

(10) Patent No.: US 10,468,890 B2
(45) Date of Patent: Nov. 5, 2019

(54) METHOD FOR SELF-ASSESSING MICROBIAL FUEL CELL ELECTRONICS FOR ENERGY HARVESTING

(71) Applicant: The United States of America as represented by the Secretary of the Navy, San Diego, CA (US)

(72) Inventors: Alex G. Phipps, San Diego, CA (US); Lewis Hsu, San Diego, CA (US); Maxwell M. Kerber, San Diego, CA (US); David B. Chadwick, San Diego, CA (US); Y. Meriah Arias-Thode, San Diego, CA (US); Jeffrey Kagan, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 290 days.

(21) Appl. No.: 15/444,722

(22) Filed: Feb. 28, 2017

(65) Prior Publication Data

US 2018/0248383 A1    Aug. 30, 2018

(51) Int. Cl.
*H02J 7/00* (2006.01)
*H01M 8/16* (2006.01)
*H01M 4/86* (2006.01)
*H01M 8/04537* (2016.01)
*H01M 4/02* (2006.01)

(52) U.S. Cl.
CPC ............. *H02J 7/0008* (2013.01); *H01M 4/86* (2013.01); *H01M 8/04552* (2013.01); *H01M 8/16* (2013.01); *H02J 7/0047* (2013.01); *H02J 7/0052* (2013.01); *H02J 7/0093* (2013.01); *H01M 2004/027* (2013.01); *H01M 2004/028* (2013.01); *H01M 2250/10* (2013.01); *Y02E 60/527* (2013.01)

(58) Field of Classification Search
None
See application file for complete search history.

*Primary Examiner* — Yoshitoshi Takeuchi
(74) *Attorney, Agent, or Firm* — Naval Information Warfare Center, Pacific; Kyle Eppele; Susanna Torke

(57) ABSTRACT

A system comprising a series of at least two benthic microbial fuel cells (BMFC), wherein each BMFC comprises an anode electrically connected to a cathode, and wherein for each BMFC there is a first and second comparator configured to monitor BMFC voltage to determine if the voltage falls below one of two present thresholds. The output of the first comparator is electrically connected to the BMFC via a switch and the output of the second comparator is electrically connected to a pulse width monitor (PWM) block via a switch. A DC/DC converter is electrically coupled to each BMFC and configured to transfer energy stored in each BMFC to a battery, wherein the DC/DC converter is driven by the PWM block.

9 Claims, 6 Drawing Sheets

METHOD FOR SELF-ASSESSING MICROBIAL FUEL CELL ELECTRONICS FOR ENERGY HARVESTING

FEDERALLY-SPONSORED RESEARCH AND DEVELOPMENT

The Method for Self-Assessing Microbial Fuel Cell Electronics for Energy Harvesting is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil. Reference Navy Case Number 102563.

BACKGROUND

Benthic microbial fuel cells (BMFC) have been shown to provide persistent power from sediment in both fresh and saltwater conditions. This technology allows persistent sensors to be used in remote or hazardous locations where energy is not readily available. BMFCs are able to generate electrical energy through microbial oxidation of organic compounds in the sediment. In all previous embodiments of BMFCs, oxidation of organic compounds in the sediment has to be coupled with oxygen reduction in the overlying water column. While cathodes can be made trawl-resistant or low-profile, their presence above the sediment surface creates some risk of detection or damage by trawlers or bottom-scouring activities.

During deployments, BMFC electrodes buried in sediment are required to remain at specific electrical potential to continue to produce power. These electrodes may become ineffective or poisoned at times due to various conditions such as oxygen intrusion, electrode fouling, and biofilm disruption. The system disclosed herein employs a strategy to actively monitor and stabilize the health of a BMFC through an electronics package to determine the potential of the fuel cell. The system will isolate disrupted electrodes from energy harvesting. This allows for the electrode to recover to a potential that is useful for power production and prevents an affected electrode from adversely impacting overall energy harvesting.

Currently no systems have reported implementation of intelligent energy harvesting from BMFCs. As a result, the system in place will continue to attempt operation of the BMFC if the system is physically disrupted or if sediment conditions change. A need exists for BMFCs to have continued efficient energy harvesting even under non-ideal conditions. Some previous systems require a BMFC to have at least three electrodes, where an anode can transform into a cathode via some reconfiguration of the wiring through processor-controlled switches. Another application allows the anode or cathode size to be dynamically adjusted to optimize BMFC operation. That design also requires at least three electrodes.

The embodiment described herein does not attempt to reconfigure an anode to cathode or vice-versa. This embodiment is designed to work with systems having only two electrodes (an anode and cathode) or variations could include multiple anodes or cathodes. This embodiment is designed to merely disconnect an electrode from the system once the fuel cell reaches a certain operating voltage. This protects the anode or cathode from operating under poor conditions. This embodiment allows for a less complex solution with simpler electronic circuits than the previously-described 3-electrode systems. This is key for low-power operation since most commercial microprocessors require more energy than one BMFC can generate.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

Figure 1:
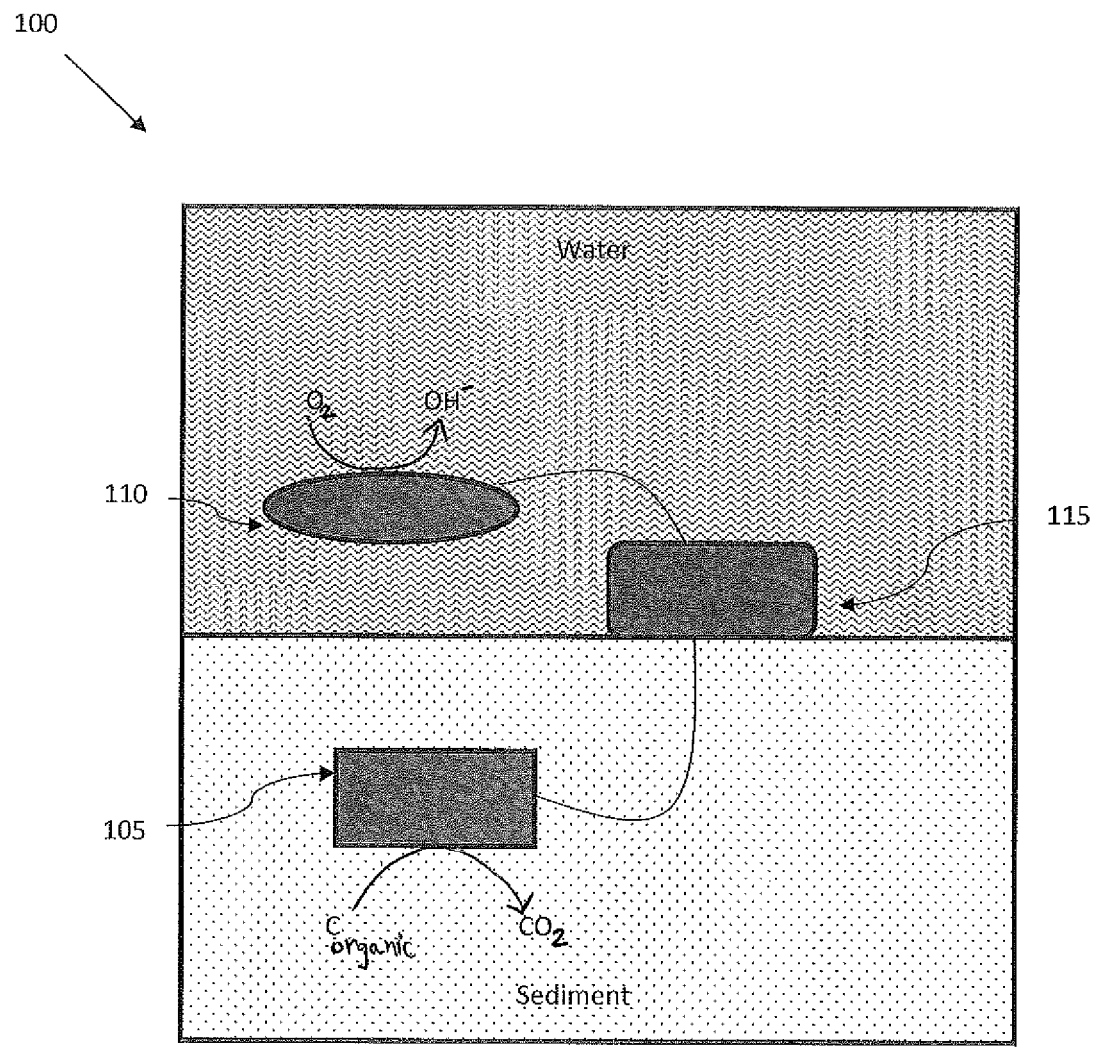
FIG. 1 shows a typical prior art configuration of a BMFC with a buried anode and cathode in accordance with the Method for Self-Assessing Microbial Fuel Cell Electronics for Energy Harvesting.

FIG. 1 shows a typical prior art configuration of a BMFC 100 with an anode 105 buried under sediment and a cathode 110 in the overlying water. BMFCs can be deployed via diver, boat-assisted, or autonomous methods. In general, deployed systems require anode 105 to be buried while a sensor/electronics load 115 and cathode 110 are located above the sediment-water interface. This configuration prevents energy from being produced in a covert manner because the sensor/electronics load and cathode are not buried.

Figure 2:
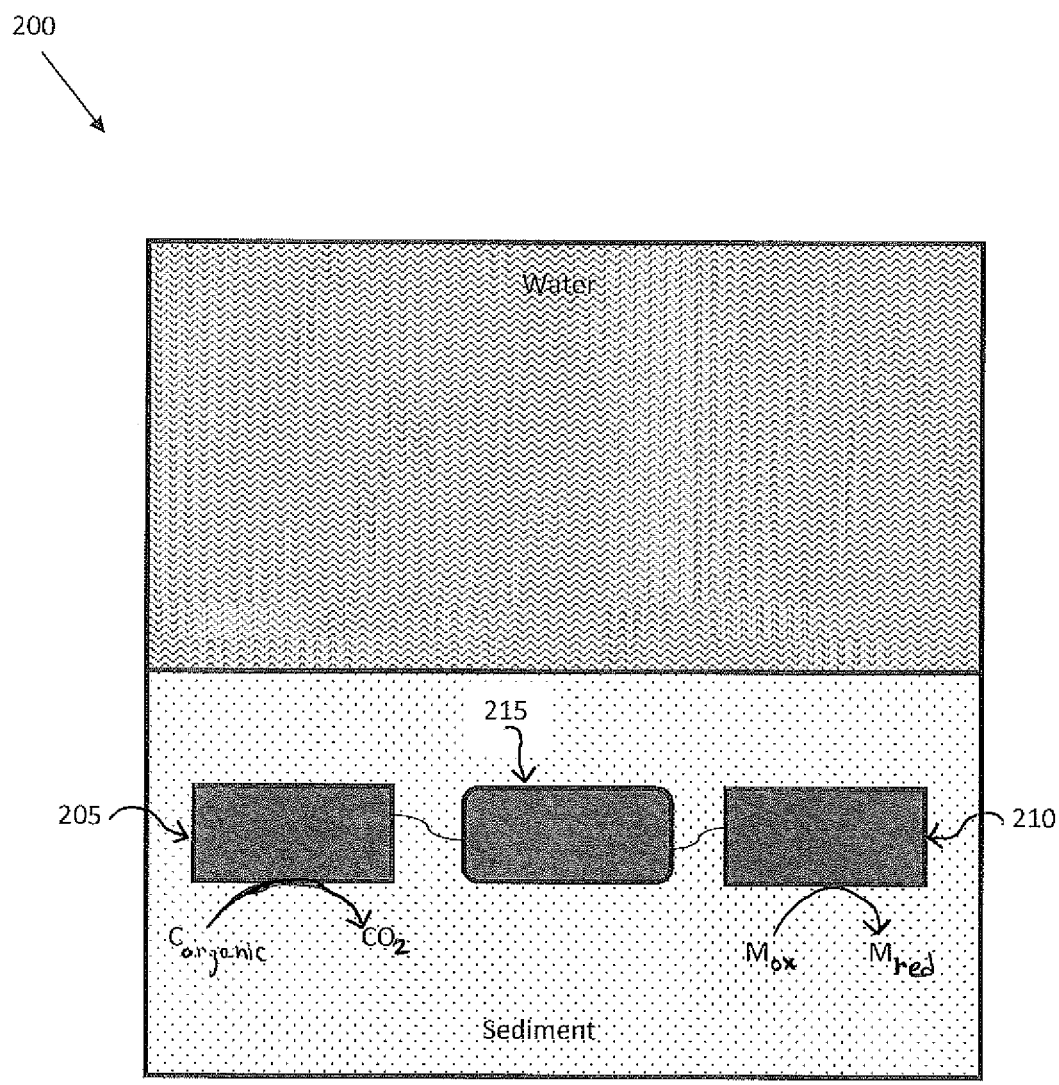
FIG. 2 shows a BMFC having a buried cathode configuration in accordance with the Method for Self-Assessing Microbial Fuel Cell Electronics for Energy Harvesting.

FIG. 2 shows a BMFC 200 having a buried cathode configuration. Anode 205 and cathode 210 are buried in the sediment underwater, along with the sensor/electronics load 215. Anode 205 and cathode 210 are electrically connected to sensor/electronics load 215.

BMFC 200 must couple the oxidation of organic material in the sediment with a reduction reaction in order to function properly. Typical systems utilize the oxygen reduction reaction that can be easily accomplished in overlying aerobic water. Here, BMFC 200 utilizes an alternative reduction reaction. Possible reactions are iron reduction ($Fe^{3+}$ to $Fe^{2+}$) or manganese reduction ($Mn^{4+}$ to $Mn^{2+}$). These compounds can be integrated with cathode 210 to sustain energy production until exhaustion. Under some circumstances, geochemical cycling of iron or manganese may provide some replenishment of the oxidized mineral to allow for extended operation of BMFC 200. It is also expected that similar systems will work in a range of salinities encompassing operation in freshwater (lakes, rivers) to saltwater (ocean).

Figure 3A:
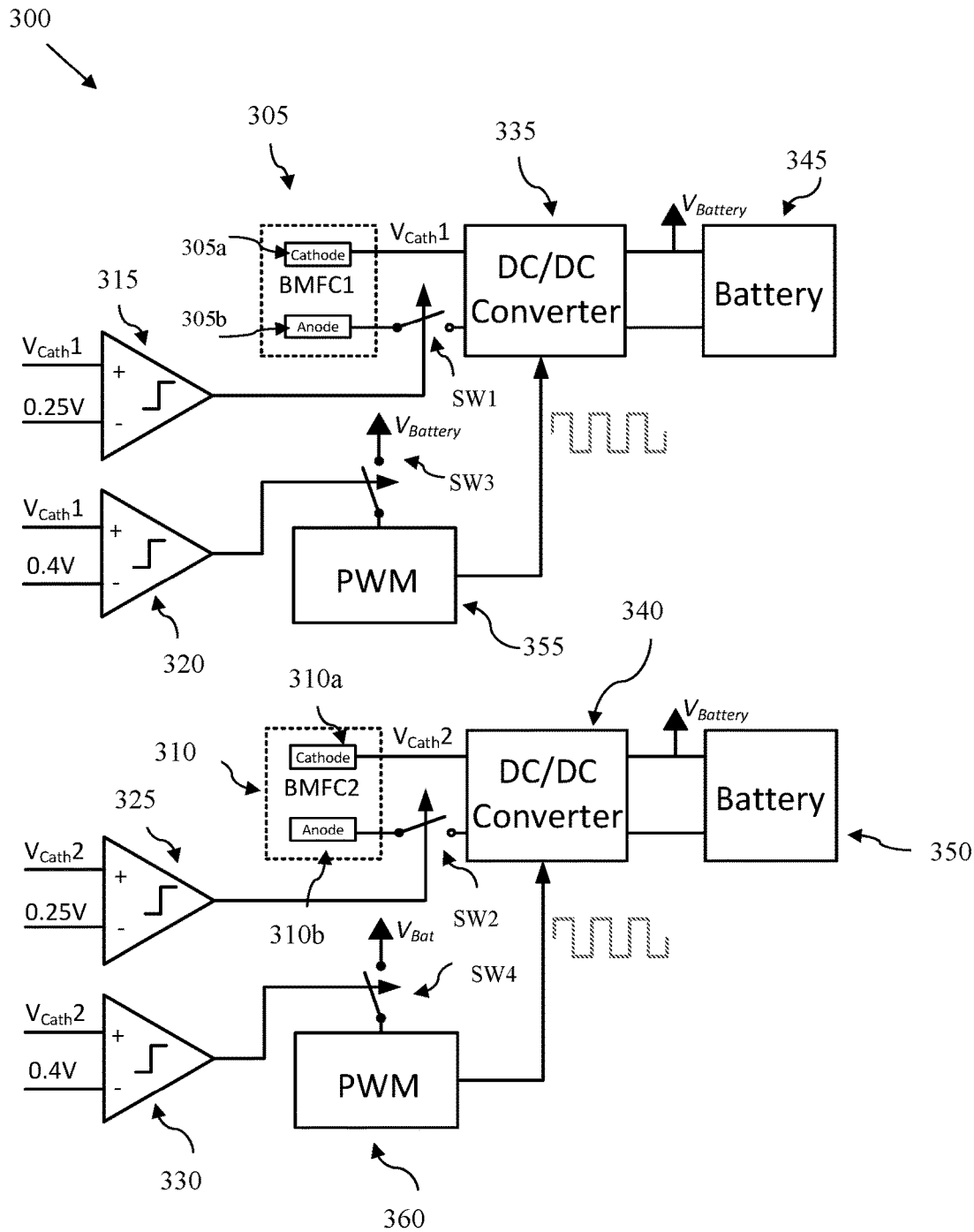
FIG. 3a shows electronics for a system in accordance with the Method for Self-Assessing Microbial Fuel Cell Electronics for Energy Harvesting.

FIG. 3a shows the electronics for a system 300 having at least two BMFCs 305 and 310. BMFC 305 has a cathode 305a and an anode 305b and a cathode voltage VCath1. BMFC 310 has a cathode 310a and an anode 310b and a cathode voltage VCath2. System 300 can be used to control a BMFC energy harvester capable of harvesting from multiple cells. System 300 has four comparators 315, 320, 325, and 330. Comparators monitor if the BMFC voltage falls below one of two preset thresholds. Here, thresholds of 0.4V and 0.25V are used in one potential embodiment. System 300 has two DC/DC converters 335 and 340 that transfer energy stored on BMFCs 305 and 310 to batteries 345 and 350, respectively. In another embodiment, batteries 345 and 350 may be the same battery. DC/DC converters 335 and 340 are driven by pulse width modulated (PWM) blocks 355 and 360 respectively. The PWM block generates a PWM signal as long as power is provided to the PWM block. PWM blocks 355 and 360 are electrically connected to batteries 345 and 350, respectively. PWM blocks 355 and 360 supply a square wave signal to DC/DC converters 335 and 340 that tell the converters 335 and 340 how to operate. System 300 has a switch SW1 located between BMFC 305 and DC/DC converter 335, and a switch SW2 located between BMFC 310 and DC/DC converter 340. The output of comparators 315, 320, 325 and 330 controls the switches SW1 and SW2. Switches SW3 and SW4 electrically connect PWM block 355 and 360 to power supplies, shown here as the battery voltage. PWM blocks 355 and 360 output a square wave whose frequency determines how efficiently power is transferred from BMFCs 305 and 310 to batteries 345 and 350, respectively.

Prior systems are deployed with passive electrical packages and they rely solely on correct placement of the device for continual power production. However, intermittent loading of a BMFC system may enable a higher degree of energy recovery. With intermittent loading, the anode is periodically switched between operation and open circuit conditions. This can prevent continued operation of a BMFC if the system is physically disrupted or if sediment conditions change. Operating under non-ideal conditions for the BMFC is not conducive to efficient energy harvest.

Figure 3B:
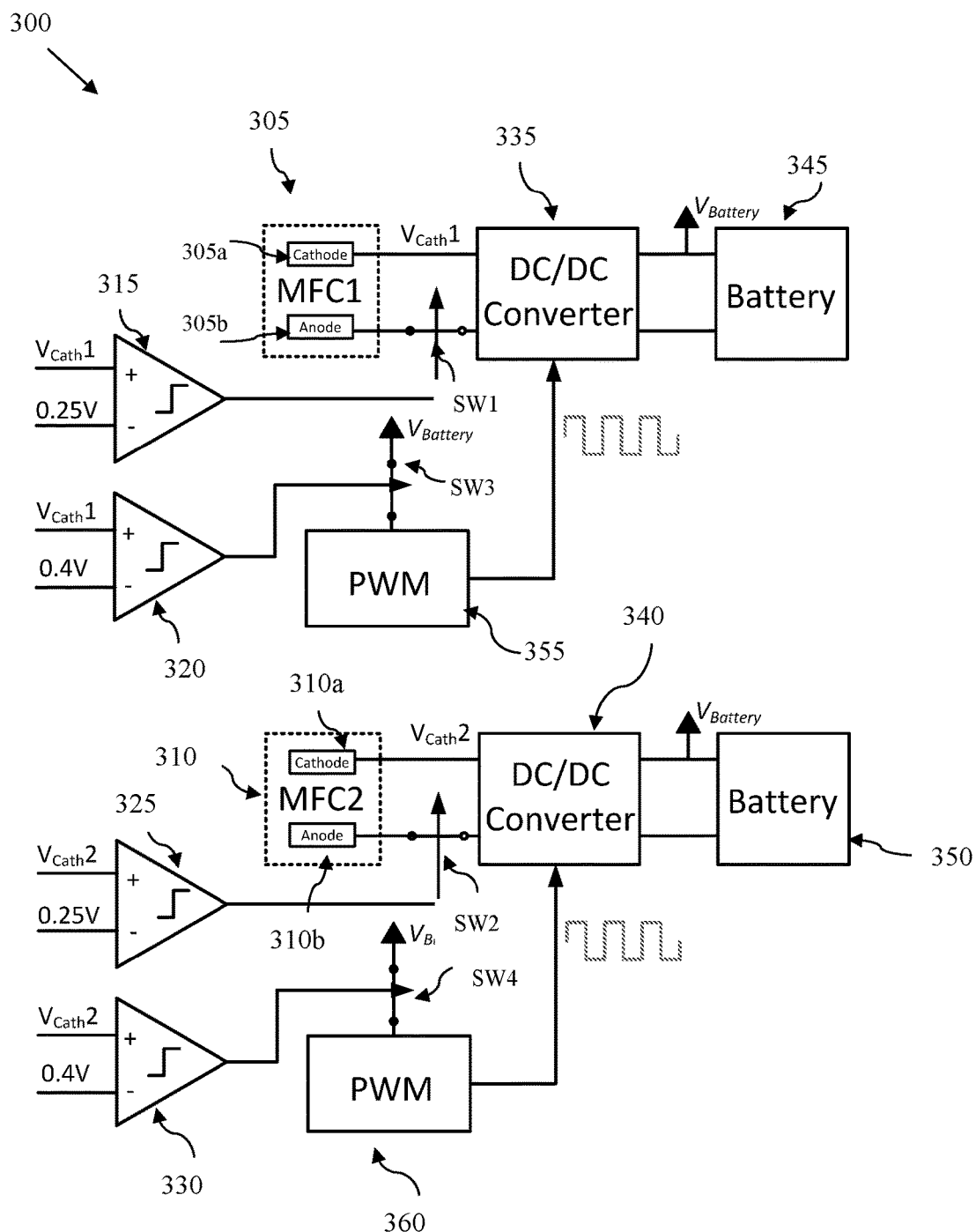
FIG. 3b shows the normal operation of system in accordance with the Method for Self-Assessing Microbial Fuel Cell Electronics for Energy Harvesting.

FIG. 3b shows the normal operation of system 300 when energy is being harvested. Cathode voltage VCath1 and VCath2 are above 0.4V. All switches are closed. Here, BMFCs 305 and 310 are electrically connected to DC/DC converter 335 and 340, respectively, and power for PWM blocks 355 and 360 is connected to the battery voltage. System 300 would be integrated into an overall energy harvesting system to manage the energy produced from the coupled reduction-oxidation reactions occurring at the anodes and cathodes of BMFCs 305 and 310. Energy captured in this manner could be used to power electronics devices or supplement existing battery capacity. With this system, the health of BMFC system 300 is continuously monitored by measuring the voltage difference between the anode and the cathode using the comparators. If the voltage difference is too low, switches SW1 and SW2 would be triggered to open, removing anodes 305b and 310b from operation until a suitable voltage gradient could be established. This allows BMFCs 305 and 310 to recover from exhaustion of chemical species, to repair damage to the microbial community, and/or to allow suitable operating conditions to return. System 300 could be implemented in multiple anode systems or in single anode systems that have been used previously. This also allows a more active approach at duty cycling anode operation, rather than simple timed operation.

With system 300, BMFC potentials are actively monitored and electrodes can be duty cycled appropriately. This is important because the chemistry of the environment changes over time, and also the BMFC itself can be physically disturbed. This active monitoring ensures harvesting will only occur when suitable conditions are available. If conditions are not suitable, then the electrode will be isolated from the system.

Figure 3C:
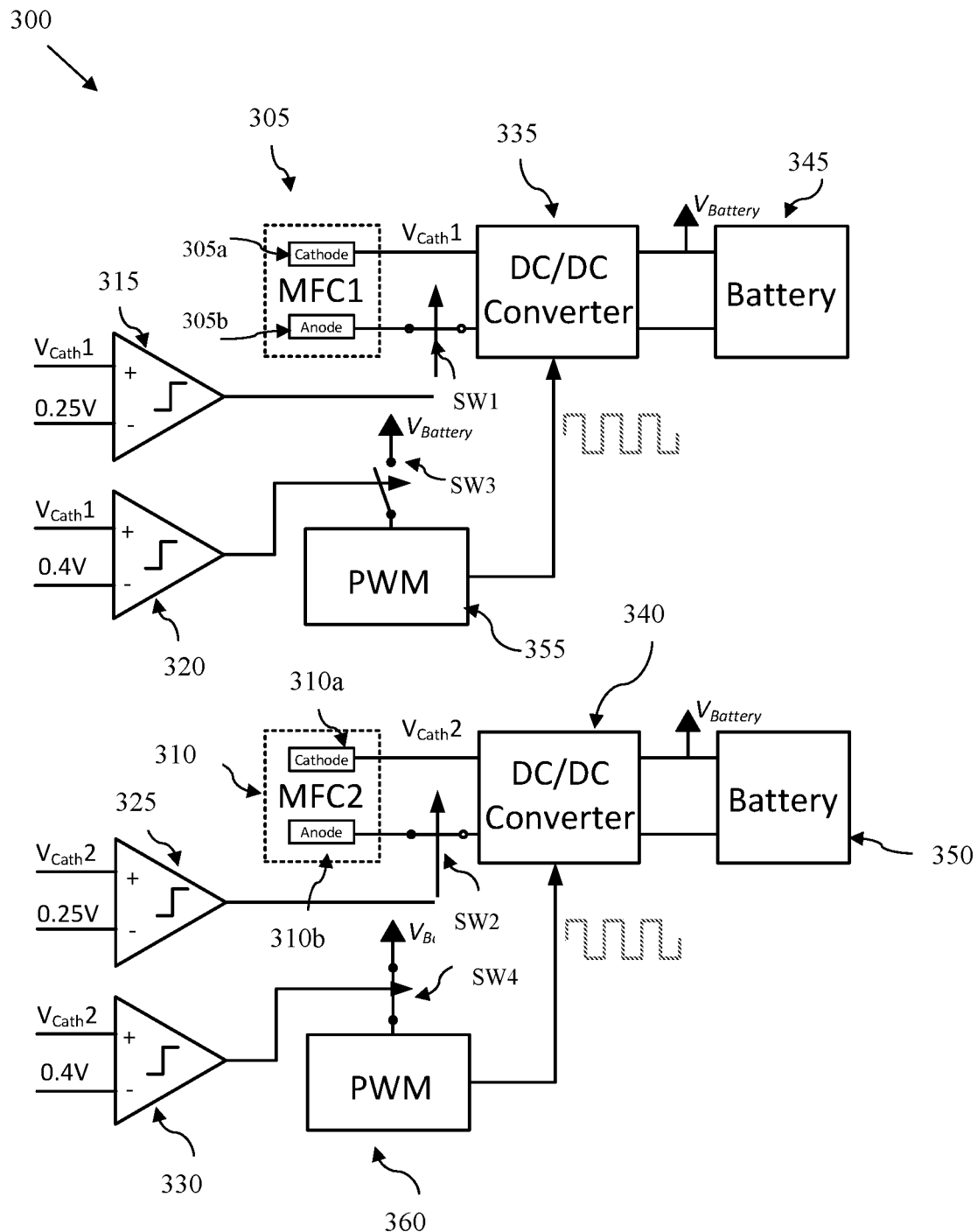
FIG. 3c shows a system with microbial fuel cell voltage between two pre-set thresholds in accordance with the Method for Self-Assessing Microbial Fuel Cell Electronics for Energy Harvesting.

FIG. 3c shows the case where BMFC 305 voltage is between the two thresholds, for example Vcath1=0.35V. In this case, switch SW3 to PWM 355 is open and power is not provided to PWM 355. Without the PWM signal, DC/DC converter 335 will not operate. With no signal to drive DC/DC converter 335, there is no transfer of power from BMFC 305 to battery 345. This mode of operation will occur when BMFC 305 cannot sustain the amount of power being drawn. Switch SW3 will remain open, stopping the flow of energy from BMFC 305 to battery 345, while BMFC 305 "rests," allowing the electrochemical gradient an opportunity to recover and its voltage to rise above the threshold. If BMFC 305 were not allowed to rest, power transfer efficiency to battery 345 would go down and BMFC 305 could be permanently damaged. BMFC 310 will continue to provide energy to its battery 350.

Figure 3D:
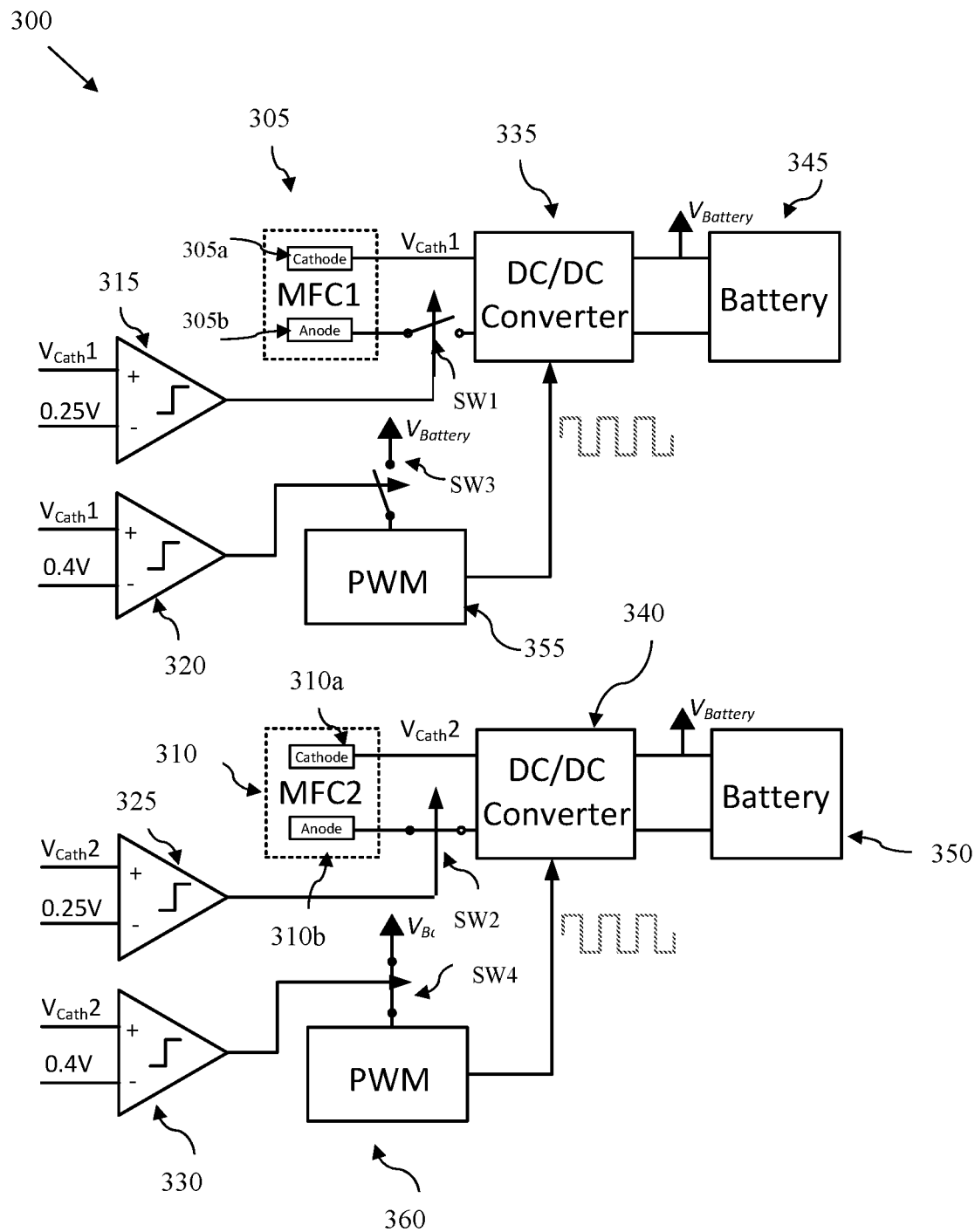
FIG. 3d shows a system with microbial fuel cell voltage below two pre-set thresholds in accordance with the Method for Self-Assessing Microbial Fuel Cell Electronics for Energy Harvesting.

FIG. 3d shows the case where BMFC 305 voltage has fallen below both thresholds, for example 0.15V. This would typically mean that BMFC 305 is damaged and could run a risk to the rest of the array of BMFCs if they are all tied together in parallel. Here the anode of BMFC 305 is open circuited and disconnected from the rest of the array. This system would work with one battery per BMFC or if they all delivered power to the same battery. If multiple batteries are being used, they do not all have to be at the same voltage. There are two thresholds, one to allow the system to rest—for optimized efficiency—and the other to disconnect the BMFC completely in case of a catastrophic failure.

One embodiment can utilize a microprocessing unit as a relay controller and voltage meter to monitor an BMFC device. The microprocessor would be programmed to monitor the voltage periodically and take the anode out of service (through latching relays) when the potential difference between the anode and cathode dropped below a certain threshold.

Another embodiment would have the system check the anode and/or the cathode potentials relative to a reference electrode. This system would be able to determine if either of these electrodes needed to be taken out of operation by comparing measure values to predetermine values.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A system comprising:
   A series of at least two benthic microbial fuel cells (BMFC), wherein each BMFC comprises:
   an anode electrically connected to a cathode;
   a first comparator configured to monitor a BMFC voltage to determine if the voltage falls below a first pre-set threshold, wherein the output of the first comparator is electrically coupled to the BMFC via a first switch;
   a second comparator configured to monitor the BMFC voltage to determine if the voltage falls below a second pre-set threshold, wherein the output of the second comparator is electrically coupled to a pulse width modulated (PWM) block via a second switch; and
   a DC/DC converter electrically coupled to each BMFC and configured to transfer energy stored in each BMFC to a battery, wherein the DC/DC converter is driven by the PWM block.

2. The system of claim 1, wherein the first switch is coupled between the first comparator and the anode, and the first switch is configured to disconnect the anode if the voltage difference between the anode and the cathode is too low.

3. The system of claim 1 wherein the first comparator is electrically coupled to the anode of the BMFC via the first switch, and the comparators are configured to use the first switch to disconnect the anode once the BMFC reaches a pre-set voltage.

4. The system of claim 3 wherein the pre-set voltage thresholds are 0.4V and 0.25V.

5. The system of claim 4 wherein the first switch is configured to re-connect the anode when a suitable voltage gradient can be re-established.

6. The system of claim 5, wherein the system is designed to operate in an oceanic environment, and where the anode of the BMFC is configured to be buried in sea-bed sediment.

7. The system of claim 1 wherein the series of BMFCs are integrated into an energy-harvesting system wherein energy produced from the BMFCs is captured and used to power electronics devices.

8. The system of claim 1 further comprising a reference electrode used to monitor relative anode and cathode potentials.

9. The system of claim 1 further comprising a microprocessing unit, wherein the microprocessing unit acts as a relay controller and voltage meter, and wherein the microprocessing unit is programmed to monitor the BMFC voltage and take the anode out of service when the potential difference between the anode and cathode is below a pre-set voltage threshold.

* * * * *